(12) United States Patent
Milkie et al.

(10) Patent No.: US 11,333,445 B1
(45) Date of Patent: May 17, 2022

(54) MODULAR MEMBRANE CONTROLLED THREE-PHASE DEPLOYABLE RADIATOR

(71) Applicant: Mainstream Engineering Corporation, Rockledge, FL (US)

(72) Inventors: Jeffrey A. Milkie, Satellite Beach, FL (US); Ian S. Wright, Rockledge, FL (US)

(73) Assignee: Mainstream Engineering Corporation, Rockledge, FL (US)

( * ) Notice: Subject to any disclaimer, the term of this patent is extended or adjusted under 35 U.S.C. 154(b) by 0 days.

(21) Appl. No.: 17/007,404

(22) Filed: Aug. 31, 2020

(51) Int. Cl.
*F28D 15/06* (2006.01)
*B64G 1/50* (2006.01)
*F28F 27/02* (2006.01)

(52) U.S. Cl.
CPC .............. *F28D 15/06* (2013.01); *B64G 1/503* (2013.01); *F28F 27/02* (2013.01)

(58) Field of Classification Search
CPC .. F28D 15/06; F28D 5/02; F28D 15/02; F28F 27/02; F28F 2250/06; B64G 1/50; B64G 1/503; B64G 1/506
USPC ............................................. 236/99 K, 34.5
See application file for complete search history.

(56) References Cited

U.S. PATENT DOCUMENTS

| | | | | |
|---|---|---|---|---|
| 5,103,897 A * | 4/1992 | Cullimore | ................ | B64G 1/50 165/41 |
| 5,195,575 A * | 3/1993 | Wylie | .................... | G21C 15/18 376/367 |
| 5,398,515 A * | 3/1995 | Lak | .......................... | B64G 1/50 62/48.1 |
| 8,656,989 B1 * | 2/2014 | Williams | ................ | F28F 27/02 165/11.1 |
| 8,991,719 B2 * | 3/2015 | Sheppard | ............ | F16H 57/0413 165/103 |
| 2003/0221812 A1 * | 12/2003 | Hsiao | ...................... | F28D 20/02 165/10 |
| 2009/0114374 A1 * | 5/2009 | Ohta | ..................... | H01L 23/427 165/104.21 |
| 2018/0274406 A1 * | 9/2018 | Dries | ..................... | F01M 5/007 |

OTHER PUBLICATIONS

Broeren & Duschatko, International Space Station Design-to-Freeze Radiators, Jul. 15, 1997, SAE International, 972345 (Year: 1997).*

(Continued)

*Primary Examiner* — Eric S Ruppert
*Assistant Examiner* — Christopher C Pillow
(74) *Attorney, Agent, or Firm* — Michael W. O'Neill, Esq.

(57) ABSTRACT

A radiator system uses an innovative passive control scheme in combination with dependable mechanical design features to meet or exceed the requirements for orbital applications. The disclosed radiator system is unique because we target an extremely high turndown ratio of 200:1 with an entirely passive two-phase pumped loop using ammonia as the working fluid. Sections of the radiator will selectively freeze to assist the turndown, and the mechanical design of the radiator can handle the high pressures experienced during such freezing and thawing events.

5 Claims, 12 Drawing Sheets

(56) References Cited

OTHER PUBLICATIONS

Weibo Chen, Thomas M. Conboy, Gregory W. Daines, and David W. Fogg, A Robust Two-Phase Pumped Loop with Multiple Evaporators and Multiple Radiators for Spacecraft Applications, 47th International Conference on Environmental Systems, ICES-2017-221, Charleston, South Carolina, Jul. 16-20, 2017.

Weibo Chen, David Fogg, Nick Mancini, John Steele, Gregory Quinn, Grant Bue, Sean Lillibridge, https://ntrs.nasa.gov/search.jsp?R=20130011331 2020-04-13T16:02:25+00:00Z, publication date Jan. 1, 2013.

Eric Sunada, Benjamin Furst, Pradeep Bhandari, Brian Carroll, Gajanana C. Birur, Terry Hendricks, Joshua Kempenaar, Hiroki Nagai, Takurou Daimaru, Kenichi Sakamoto, Stefano Cappucci, Jordan Mizerak, A Two-Phase Mechanically Pumped Fluid Loop for Thermal Control of Deep Space Science Missions, 46th International Conference on Environmental Systems, ICES-2016-129, Vienna, Austria, Jul. 10-14, 2016.

Andrew Lutz, Calin Tarau, and Srujan Rokkam, Variable-View-Factor Two-Phase Radiator, 49th International Conference on Environmental Systems, ICES-2019-211, Boston, Massachusetts, Jul. 7-11, 2019.

J. Verdonck, P. Hugonnot, A. Ferrero, J. Martinez Martin,, M., Serrano Serrano, and A. Torres Sepúlveda, Development and qualification of a Deployable Radiator in the frame of the European Horizon 2020 Pegasus program, 48th International Conference on Environmental Systems, ICES-2018-293, Albuquerque, New Mexico, Jul. 8-12, 2018.

\* cited by examiner

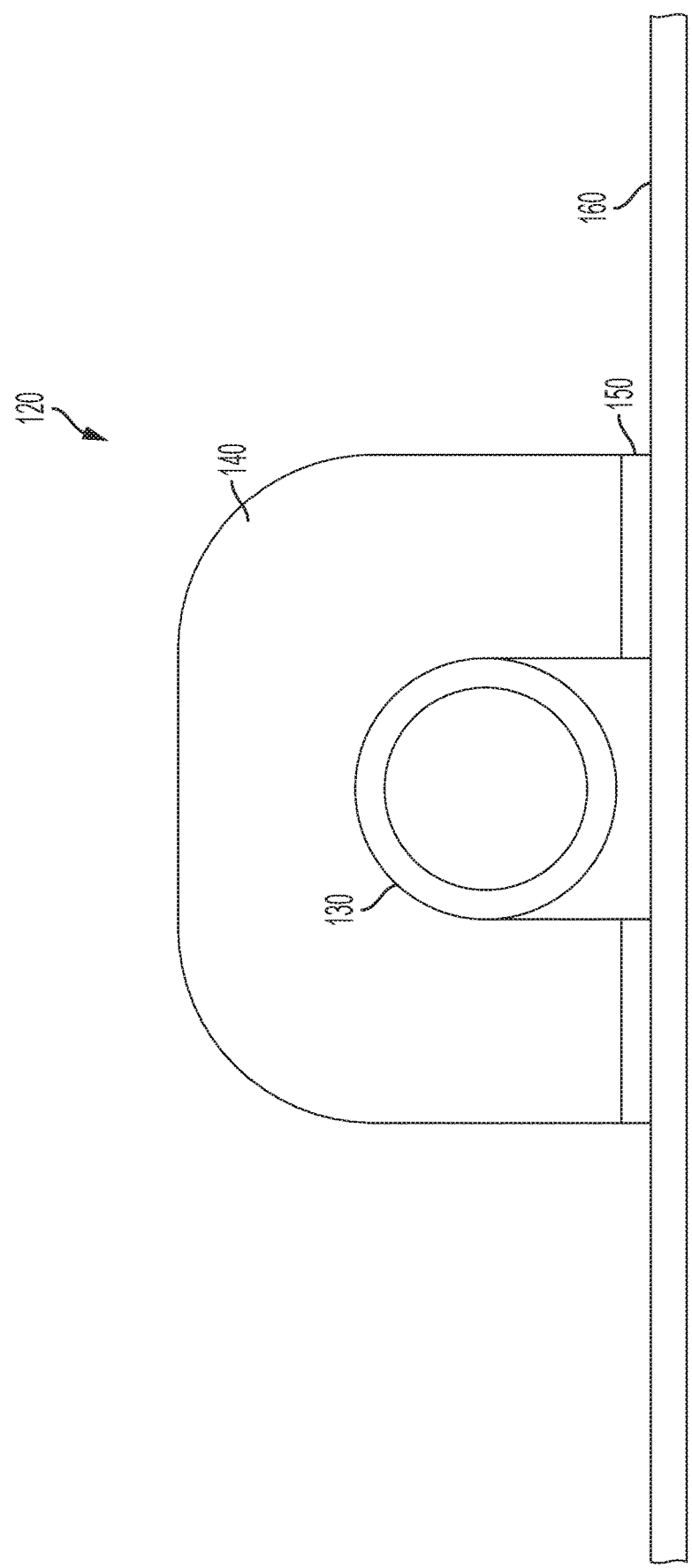

MODULAR MEMBRANE CONTROLLED THREE-PHASE DEPLOYABLE RADIATOR

BACKGROUND

The present invention is directed to spacecraft thermal management. Particularly, the present invention is concerned with using a deployable radiator design for two-phase mechanically pumped fluid loop system that provides a passive turn-down capability via stagnation and freeze of the ammonia working fluid in the radiator condenser.

Turn-down or turndown ratio means the ratio of rejected heat to maximum possible heat rejection while maintaining coolant temperature. For example, a cooling system designed to for a 500 W thermal load is designed to provide fluid to the heat generating components at 25° C. while rejecting heat to deep space at −269° C. With a 200:1 turn down ratio, the system now operates with a 2.5 W thermal load. With a fixed radiator, the fluid temperature provided will cool substantially lower than the design temperature of 25° C. which is not desirable. The passive turn-down capability modulates the radiator performance proportional to the applied heat load from 2.5 to 500 W such that the fluid temperature is always maintained at 25° C.

Radiator designs for two-phase mechanically pumped loops that allow passive turn-down capability through freezing of the ammonia working fluid in the radiator are being sought after for orbital applications. This is being sought after because for reliability and reduction in moving parts and the turn down capability is for precisely cooling discrete heat sources, such as electronics, over a large wide range of operating modes. The primary design requirements are a passive turn-down capability of greater than 200:1 allowing coolant freezing, and allowable mass of less than 8 kg/m², and a 15 year design life in either low lunar orbit, Jupiter orbit, and inner to outer planet exploration.

Two-phase radiators, and radiators with freezing features or freezing mitigation techniques have been developed for a number of missions in order to raise the performance and heat dissipation range of spacecraft. NASA's technology roadmap specifically lists two-phase pumped loop systems as an enabling thermal management technology for future missions. https://www.nasa.gov/sites/default/files/atoms/files/2015_nasa_technology_roadmaps_ta_14_thermal_management_final.pdf.

The International Space Station features single-phase pumped loop ammonia radiators. While these radiators are not intended to freeze, they are designed to safely handle freezing.

Sunada, et al. performed thermal modeling of a two-phase pumped loop for deep space missions. The authors identified core requirements and constructed a 1-D thermal model for future deployable mechanically pumped fluid loop. This model serves as the baseline for expected environment and mission conditions, including a 500 W nominal radiator heat load, a radiation sink temperature of 4 K, and the pumped loop components of the evaporator, low-power pump, and accumulator.

A number of actively controlled two-phase radiator designs with turndown capabilities have been demonstrated. Their contributions include the stabilization of the two-phase systems in microgravity using membrane phase separators, and by absorbing the volume change associated with solid-liquid working fluid transition elastically in the radiator flow channels, Chen and Fogg, et al. The systems developed used R134a, Chen and Conboy, et al. or water-based coolants Chen and Fogg et al., and have active instead of passive control. While those authors have demonstrated turndown ratios greater than 10; these the demonstrations of turndown ratio are significantly below the needed ratio of 200:1.

Several two-phase freeze-tolerant radiator designs have been proposed using heat pipes. See Leconssais, et al. and Nabity, et al. Two-phase pumped loops have advantages over heat pipe base systems, including less sensitivity to pressure drops which allow longer transport distances, smaller piping diameters, and multiple condensers, as well as less sensitivity to system charge, and greater flow control, especially in start-up and turn-down. See Sunada, et al. It is worth noting that a number of designs have been presented that seek to avoid freezing events entirely through mechanical feature changes in the radiator, including bending of the radiator surface to change the effective radiator view factor, see Lutz, et al., and selective covering of the radiator surface through louver actuation, see Garrison et al. These methods, however, add additional weight and complexity due to the mechanical moving parts.

For the foregoing reasons, there is a need for a deployable radiator design for two-phase mechanically pumped fluid loop system that provides a passive turn-down capability via stagnation and freeze of the ammonia working fluid in the radiator condenser.

SUMMARY

The disclosed radiator system uses an innovative passive control scheme in combination with dependable mechanical design features to meet or exceed the requirements for orbital applications. The disclosed radiator system is unique because we target an extremely high turndown ratio of 200:1 with an entirely passive two-phase pumped loop using ammonia as the working fluid. Sections of the radiator will selectively freeze to assist the turndown, and the mechanical design of the radiator can handle the high pressures experienced during such freezing and thawing events.

BRIEF DESCRIPTION OF THE DRAWINGS

These and other features, aspects, and advantages of the present invention will become better understood with regard to the following description, appended claims, and accompanying drawings where:

FIG. 7 shows an elevation view of the channels for the refrigerant to pass therethrough.

DESCRIPTION

In the Summary above and the Description, and the claims below, and in the accompany drawings, reference is made to particular features (including method steps) of the invention. It is to be understood that the disclosure of the invention in this specification includes all possible combinations of such particular features. For example, where a particular aspect or embodiment of the invention, or a particular claim, that feature can also be used, to the extent possible, in combination with and/or in the context of the other particular aspects and embodiments of the invention, and in the invention generally.

Figure 1A:
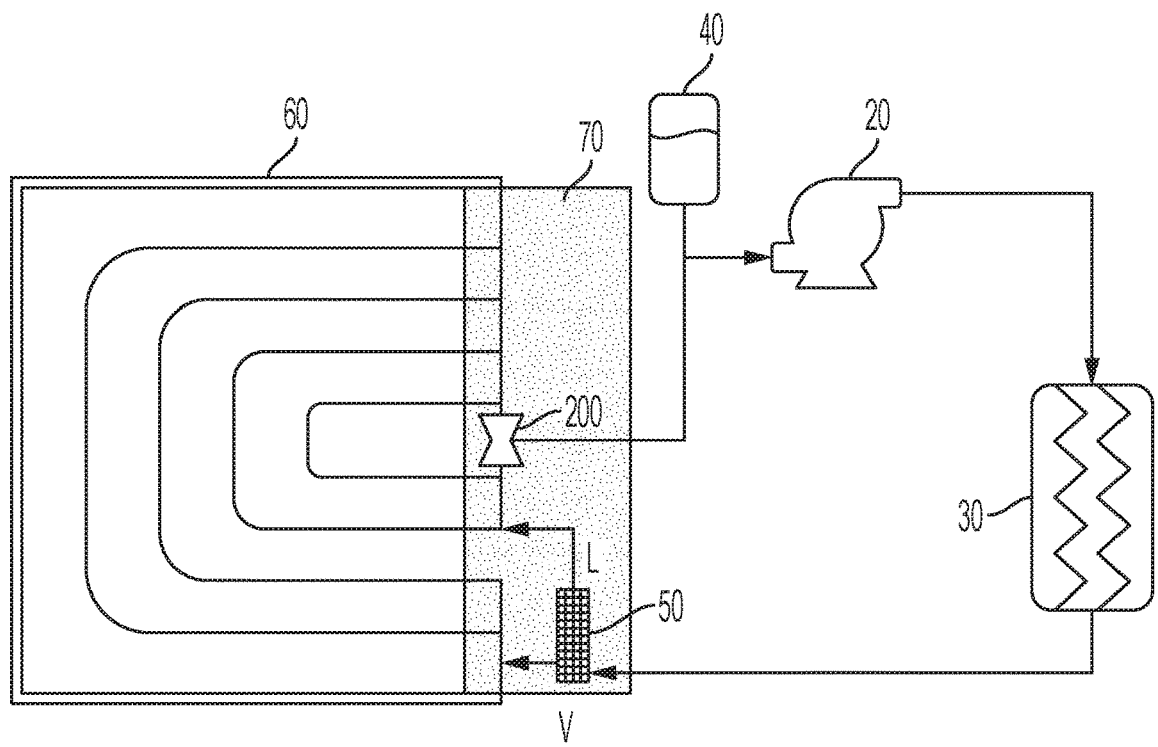
FIG. 1A shows the layout of the radiator having the phase separator incorporating into the control module.
Figure 1B:
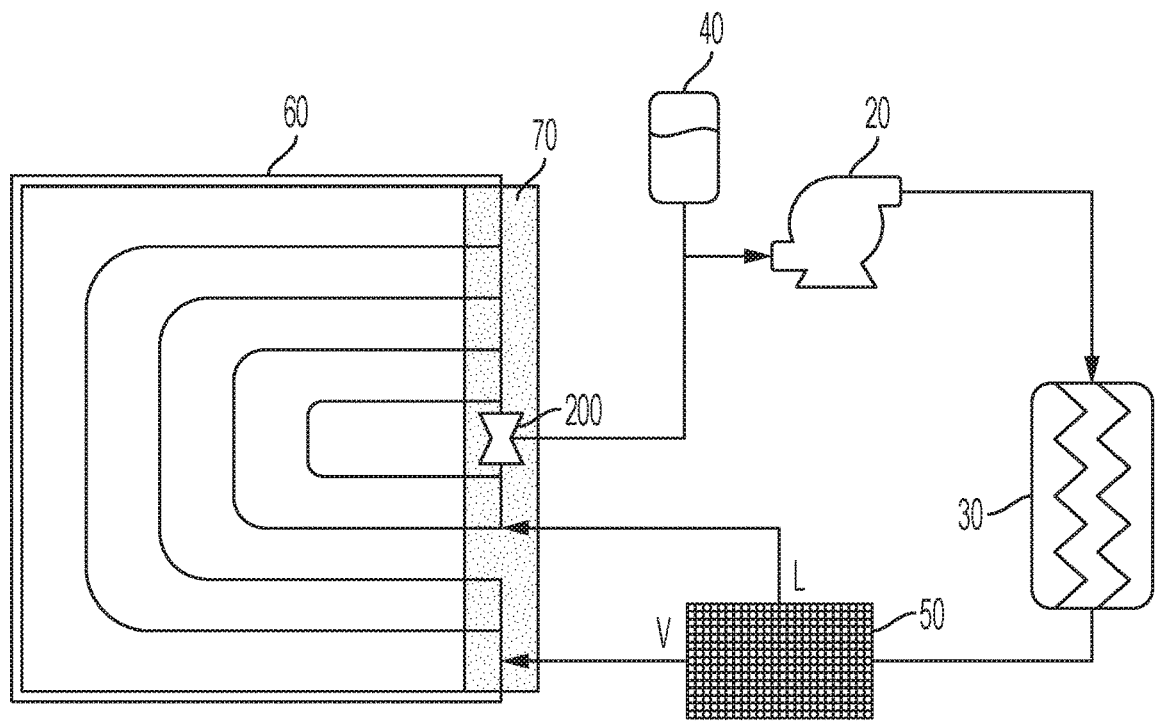
FIG. 1B show the layout of the radiator having the phase separator external to the control module.

The Modular Membrane Controlled Three-phase Deployable Radiator (MMC-TDR) includes a radiator panel 60, a phase separator 50, and bypass control valve 200. As shown in FIG. 1A, the phase separator 50 is integral with the radiator panel 60 both the phase separator 50 and bypass valve are located in the control module 70. As shown in FIG. 1B, the phase separator 50 is separate from the radiator panel 60. The system is schematically shown in FIGS. 1A and 1B, i.e., the radiator panel 60 and the phase separator 50 integrated into a two-phase pumped loop using ammonia, or similar fluid, as the process fluid. The two-phase pump loop includes a pump 20, the spacecraft heat exchanger (HX) 30, and accumulator 40.

The ammonia flowing from the pump 20 receives the heat in the spacecraft HX 30. During periods of high duty operation, i.e., high heat duty when the spacecraft is rejecting a lot of heat, the ammonia will partially evaporate in the spacecraft HX 30, so that it exits as a two-phase mixture of liquid and vapor. Under low duty operation, little heat rejection, the ammonia will only heat sensibly (in the liquid phase) because of the subcooling requirement for the pump 20 and the large pressure loss in the system. The single- or two-phase ammonia then enters the phase separator 50 that separates the liquid ammonia L from the vapor ammonia V. Separation of the liquid and vapor phases is important when fluid is two-phase, so that vapor cannot bypass the radiator panel 60 and damage the pump 20. The phase separator 50 is an integrated membrane phase separator that achieves separation via capillary action. Capillary action derived separation allows operation that is insensitive to gravity and inertia effects which allows operation in space, i.e., low to zero gravity, with high and low/vapor load.

Figure 2:
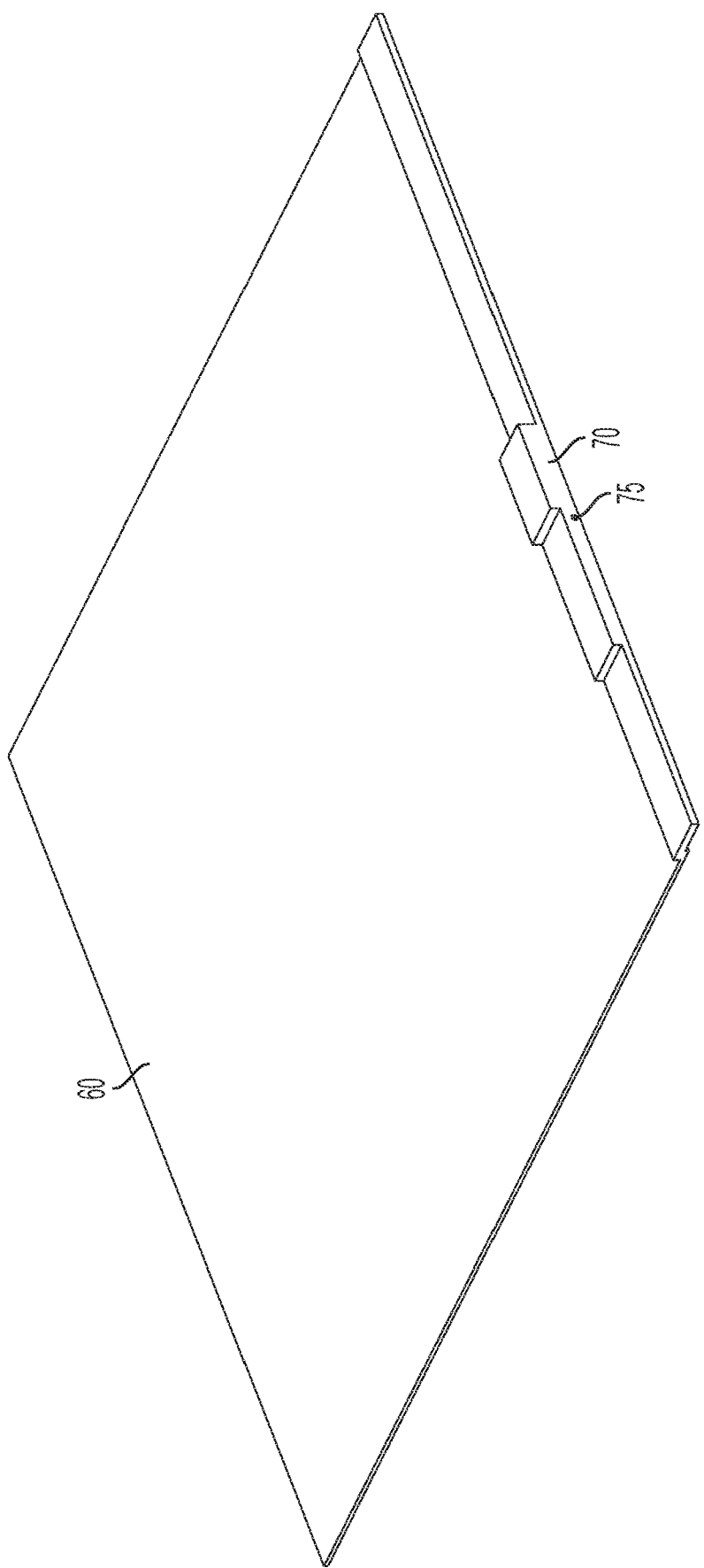
FIG. 2 shows the radiating side of the radiator and the control module integrated with the radiator panel and the inlet for the two-phase refrigerant coming from the heat exchanger to enter the control module.

FIG. 2 shows the radiating side of the radiator panel 60. Attached to the radiator panel is the control module 70. As shown, the control module 70 is integrated to the radiator panel 60. However, it is contemplated that the control module 70 could be separate from the radiator panel 60 and runners connecting the channels within the radiator panel would connect to the distribution and collection headers in the control module. The control module has an inlet 75 for the two-phase refrigerant stream to enter. Within the control module 70 are the distribution heaters and the collection header as well as the bypass valve 200.

Figure 3:
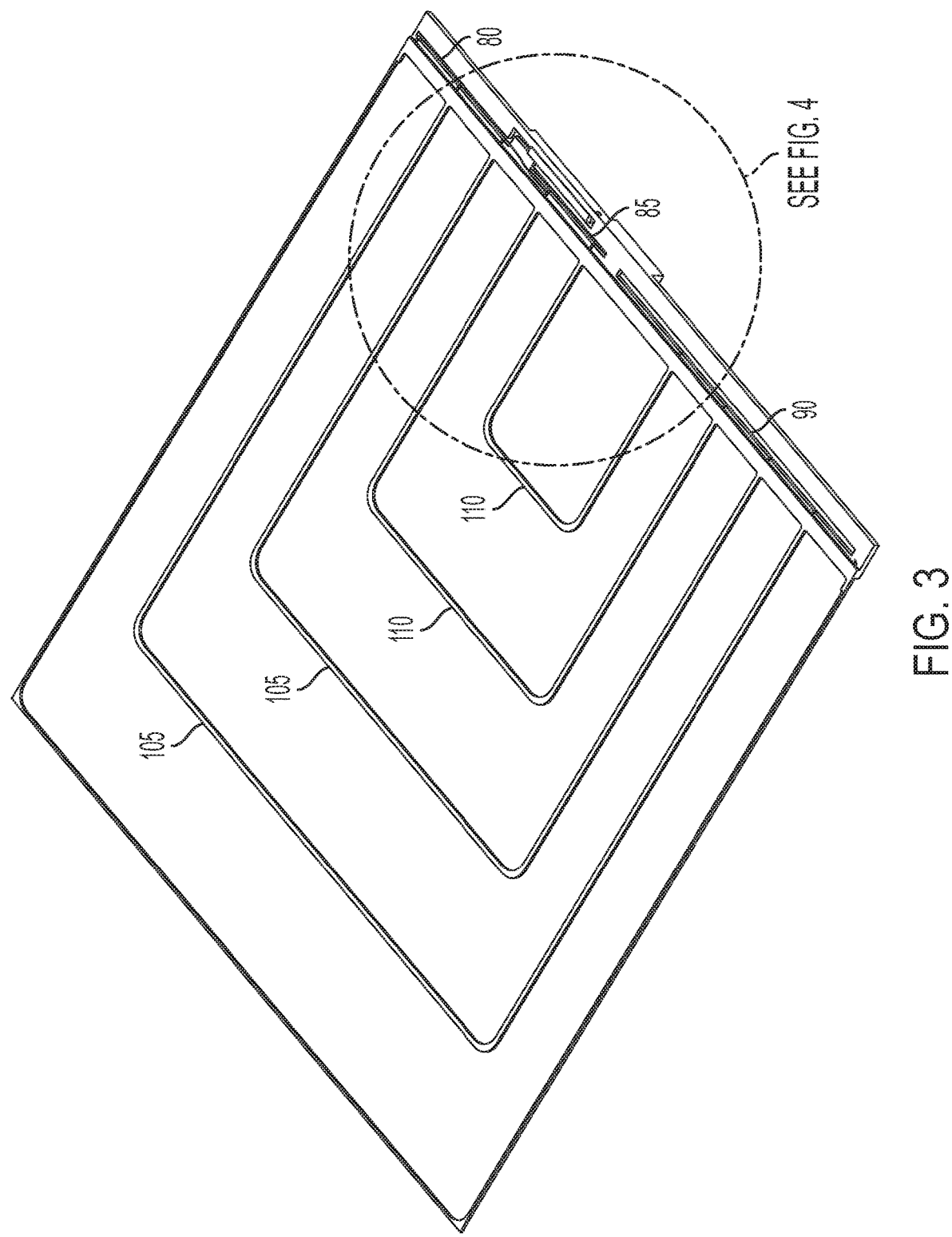
FIG. 3 shows the opposite side of the radiator panel showing the flow channels and a cut-away section of the control module depicting the distribution and collection headers.

FIG. 3 shows the opposite side of radiating side of radiator panel 60 and the control module 70 in a sectional and cut-away view. As depicted in FIG. 3, U-shaped integrated flow channels that consists of outer channels 105 and inner channels 110 and run from two distribution headers 80 and 85 to the collection header 90.

Figure 4:
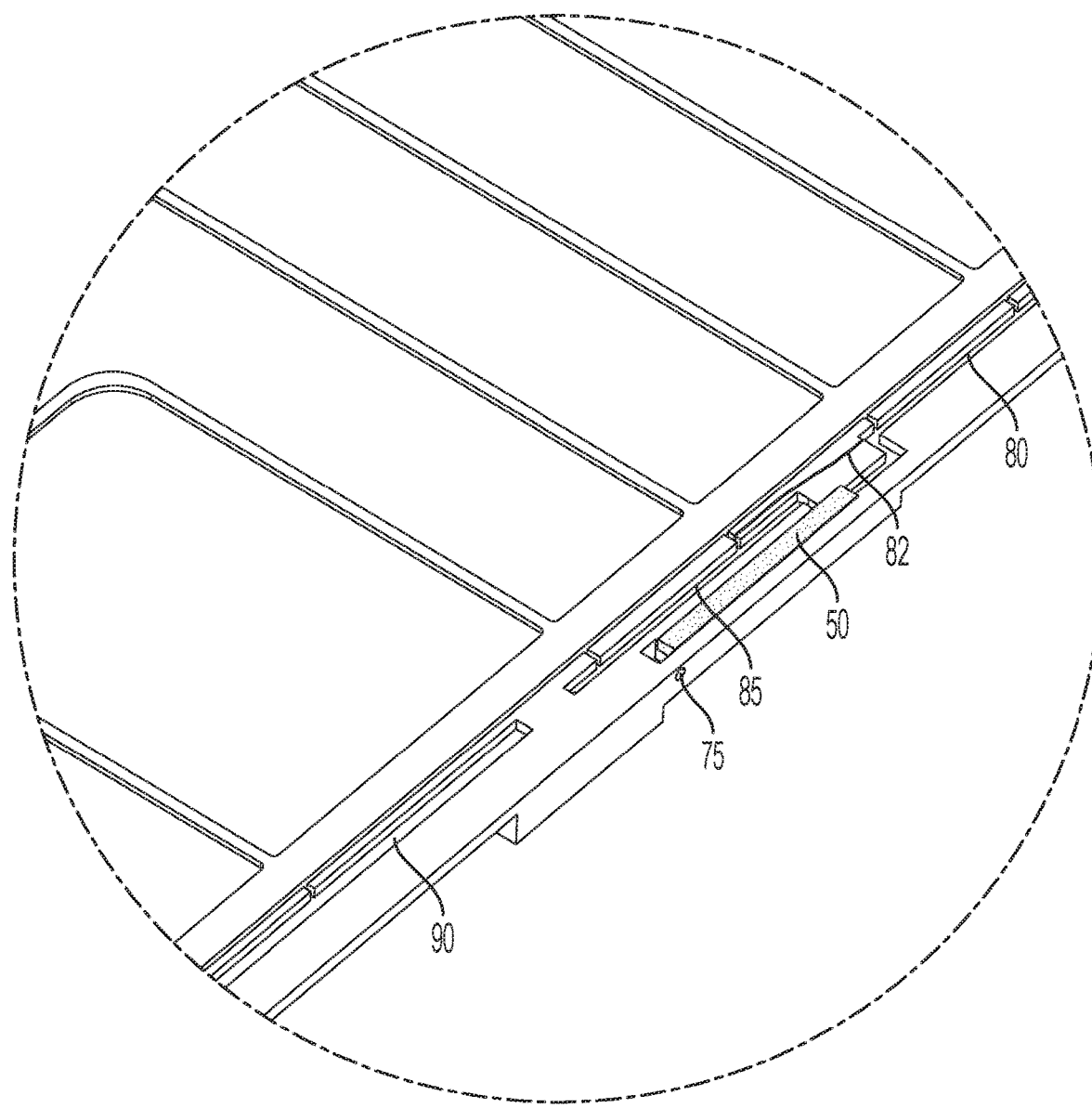
FIG. 4 shows a close up of the control module section with the phase separator integrated therein
Figure 5:
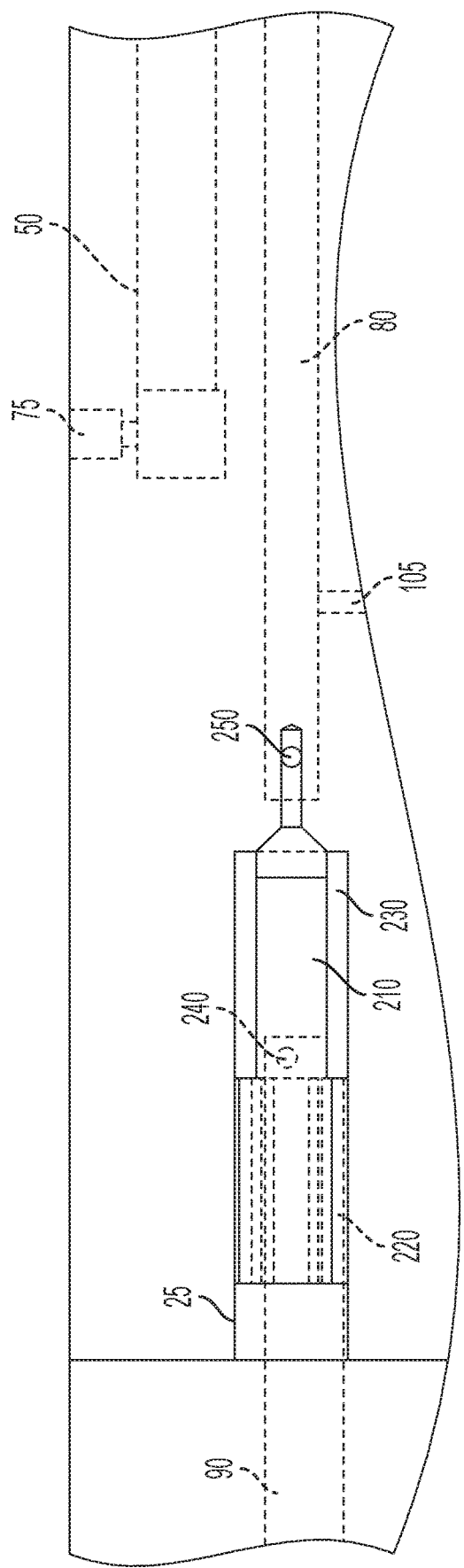
FIG. 5 shows a sectional of the control module that contains the bypass control valve.

The internal flow distribution and phase change material (PCM) control valve implementation are shown in FIGS. 4 and 5, respectively. The separated vapor and liquid ammonia streams enter the control module 70 at inlet 75 and the streams are distributed separately to the radiator panel 60 through the two distribution headers 80 and 85. The vapor ammonia that flows through the outer radiator channels 105 is condensed and subcooled, while the liquid ammonia flows through the inner radiator channels 110 and is only subcooled. The subcooled liquid from both streams are combined in the collection header 90 on the other side of the radiator panel 60.

During transient operation, vapor may exit the phase separator 50 into the vapor distribution header 80 at a time when all outer channels 105 remain blocked due to solidified fluid in the channels. To prevent backup of vapor into the phase separator 50 which may result in increased differential pressure for the radiator panel 60, a capillary tube 82 is used to introduce the small amount of vapor into the inner channels 110, along with the liquid. During full operation, the vapor flow through the capillary tube 82 will be minimal due to the low pressure difference between the vapor and liquid distribution headers, 80 and 85, respectively.

FIG. 5 shows the part of the control module 70 that contains the PCM bypass valve 200 which includes the valve portion 210 and sensing element 220. A mixing section 230 surrounds the valve portion 210. Bypass line 250 connects the liquid distribution header 80 with the mixing section 230. The sensing element 220 is positioned between the mixing section 230 and the return line 25 that returns the ammonia to the pump 20. The collection header 90 ends at an orifice 240 that permits the returning ammonia to enter the mixing section 230 where ammonia from the bypass line 250 may also enter and both fluids mix before passing over the sensing element 225. Once the mixed fluids pass the sensing element 225, the mixed fluids enter into the return line 25 which sends the mixed fluids to the pump 20.

Figure 6A:
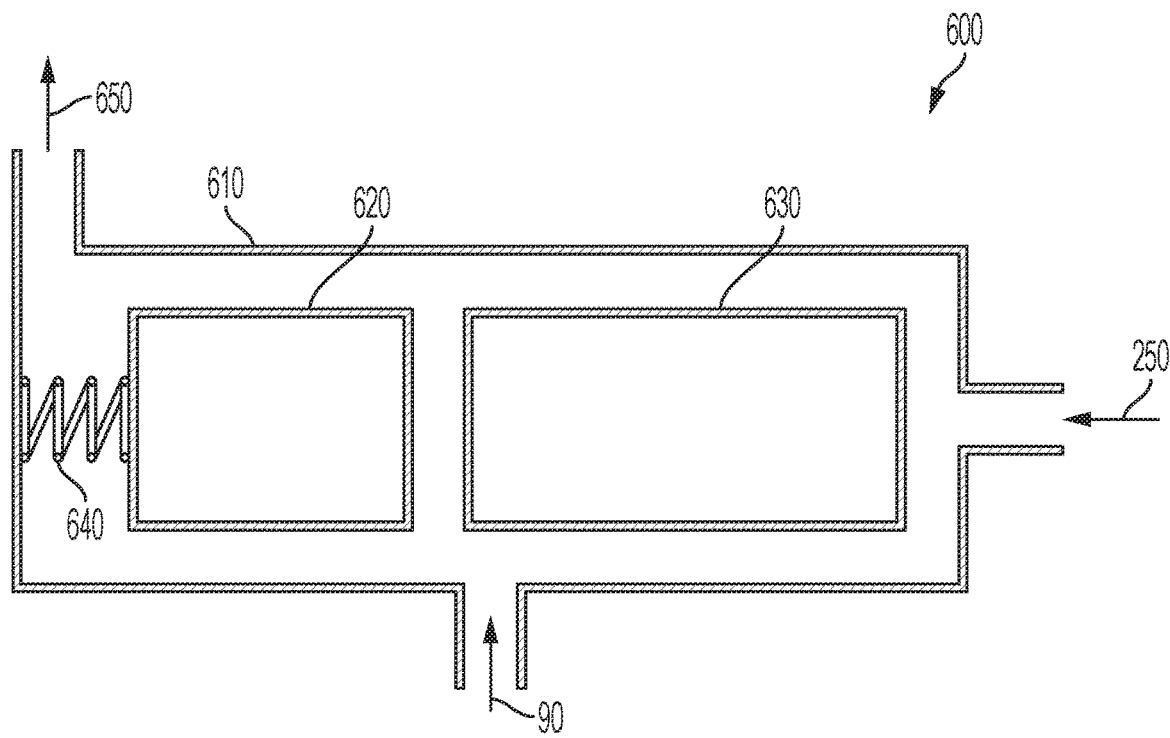
FIGS. 6A-6G show alternative embodiments of the bypass control valve.
Figure 6B:
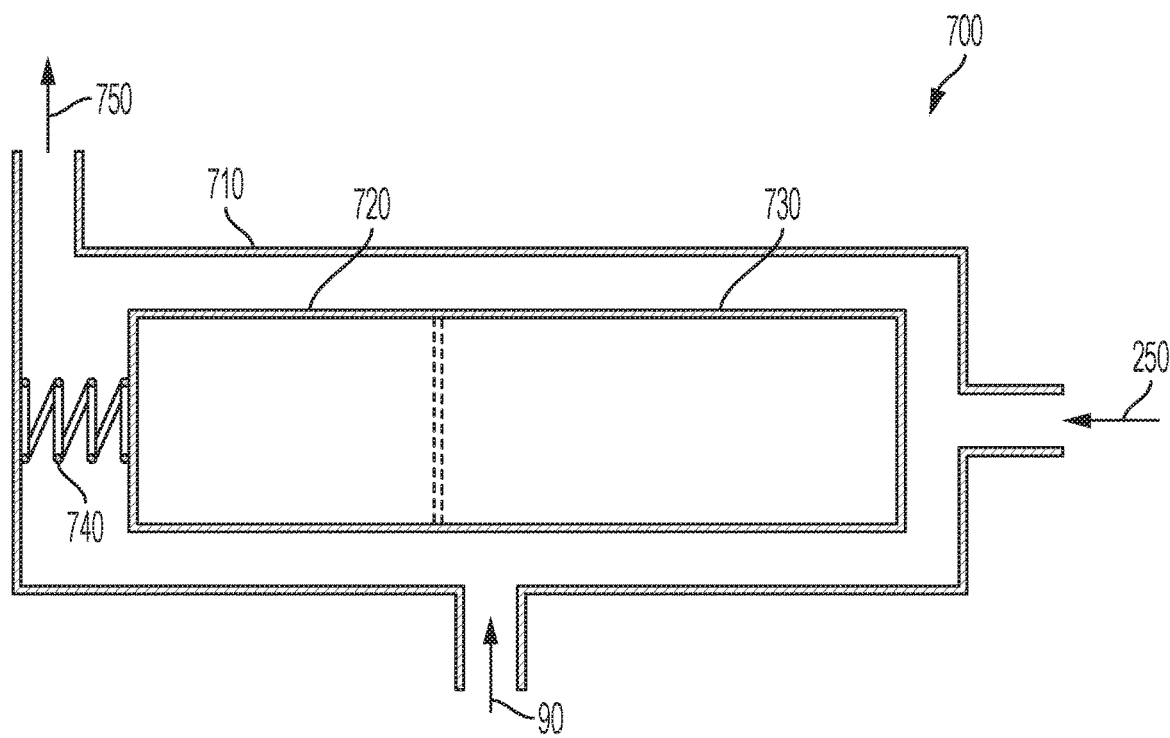

FIGS. 6A and 6B show the general concepts of having a separate sensing element and mechanical valve configuration for the bypass control valve (FIG. 6A) and having the sensing element and mechanical valve as integrated (FIG. 6B). The purpose of the bypass control valve is to maintain a consistent temperature of the fluid returning to the pump 20. FIGS. 6C to 6G show various alternative bypass valve embodiments.

In FIG. 6A, the bypass control valve 600 is shown which consists of a housing 610, sensing device 620, mechanical valve 630, and a damage prevention device 640. The sensing device may include at least one phase change material (PCM) (not shown) where the melt temperature of the PCM is near the desired fluid temperature of return to pump stream 650. The sensing device 620 exerts a force on the mechanical valve 630 such that the force increases with increasing temperature of the sensing device. As the temperature of the sensing device 620 decreases, the force exerted on the mechanical valve 630 decreases. The mechanical valve 630 controls the flow of liquid bypass flow from the liquid distribution header 85 through the liquid bypass line 250 such that the flow of liquid bypass flow from the liquid distribution header 85 increases with decreasing force exerted by the sensing device 620. Conversely, as the force exerted by the sensing device 620 increases, the mechanical valve 630 closes and reduces the liquid bypass flow. Above a predetermined temperature of the sensing device 620, the mechanical valve 630 is completely closed such that no liquid bypass flow is allowed through the mechanical valve 630. In embodiments with a PCM in the sensing device 620, the predetermined temperature is controlled by the melt temperature of the PCM. The volume change associated with freezing and melting of the PCM is used to generate higher force and motion changes per degree change than available for single phase devices. Liquid ammonia, or similar fluid, from the liquid distribution header 85 enters the housing from the liquid bypass 250 and flows through the mechanical valve 630. The flow from the collection header 90 enters the housing prior to the sensing device 620. The fluid from the collection header 90 and the fluid from the liquid bypass 250 are mixed prior to the sensing device 620 into a combined stream. The combined stream flows past the sensing device 620 such that the temperature of the combined stream and the sensing device 620 become similar. The combined stream then exits the housing 610 to return to the pump via the pump stream 650. The damage prevention device 640, which can be optional, in this embodiment is a spring or similar compressible material. The damage prevention device 640 is used to prevent damage to the sensing device 620, mechanical valve 630, or housing 600 during storage and operation when temperatures exceed minimum or maximum design temperatures. When this occurs, differences in thermal expansion coefficients of dissimilar materials may result in extreme forces on the components, resulting in permanent damage. The damage prevention device functions as a rigid surface during normal operation but is compressible when forces exceed normal conditions.

In FIG. 6B, the bypass control valve 700 is shown which consists of a housing 710 and integral valve element which consists of a sensing device 720, mechanical valve 730, and a damage prevention device 740. The sensing device 720 may include at least one phase change material (PCM) (not shown) where the melt temperature of the PCM is near the desired fluid temperature of return to pump stream 750. The sensing device 720 exerts a force on the mechanical valve 730 such that the force increases with increasing temperature of the sensing device. As the temperature of the sensing device 720 decreases, the force exerted on the mechanical valve 730 decreases. The mechanical valve 730 controls the flow of liquid bypass flow from the liquid distribution header 85 through the liquid bypass line 250 such that the flow of liquid bypass flow from the liquid distribution header 85 increases with decreasing force exerted by the sensing device 720. Conversely, as the force exerted by the sensing device 720 increases, the mechanical valve 730 closes and reduces the liquid bypass flow. Above a predetermined temperature of the sensing device 720, the mechanical valve 730 is completely closed such that no liquid bypass flow is allowed through the mechanical valve 730. In embodiments with a PCM in the sensing device 720, the predetermined temperature is controlled by the melt temperature of the PCM. The volume change associated with freezing and melting of the PCM is used to generate higher force and motion changes per degree change than available for single phase devices. Liquid from the liquid distribution header 85 enters the housing from the liquid bypass line 250 and flows through the mechanical valve 730. The flow from the collection header 90 enters the housing prior to the sensing device 720. The fluid from the collection header 90 and the fluid from the liquid bypass line 250 are mixed prior to the sensing device 720 into a combined stream. The combined stream flows past the sensing device 720 such that the temperature of the combined stream and the sensing device 720 become similar. The combined stream then exits the housing 710 to return to the pump. The damage prevention device 740, which is optional, in this embodiment is a spring or similar compressible material. The damage prevention device 740 is used to prevent damage to the sensing device 720, mechanical valve 730, or housing 710 during storage and operation when temperatures exceed minimum or maximum design temperatures. When this occurs, differences in thermal expansion coefficients of dissimilar materials may result in extreme forces on the components, resulting in permanent damage. The damage prevention device 740 functions as a rigid surface during normal operation but is compressible when forces exceed normal conditions.

Figure 6C:
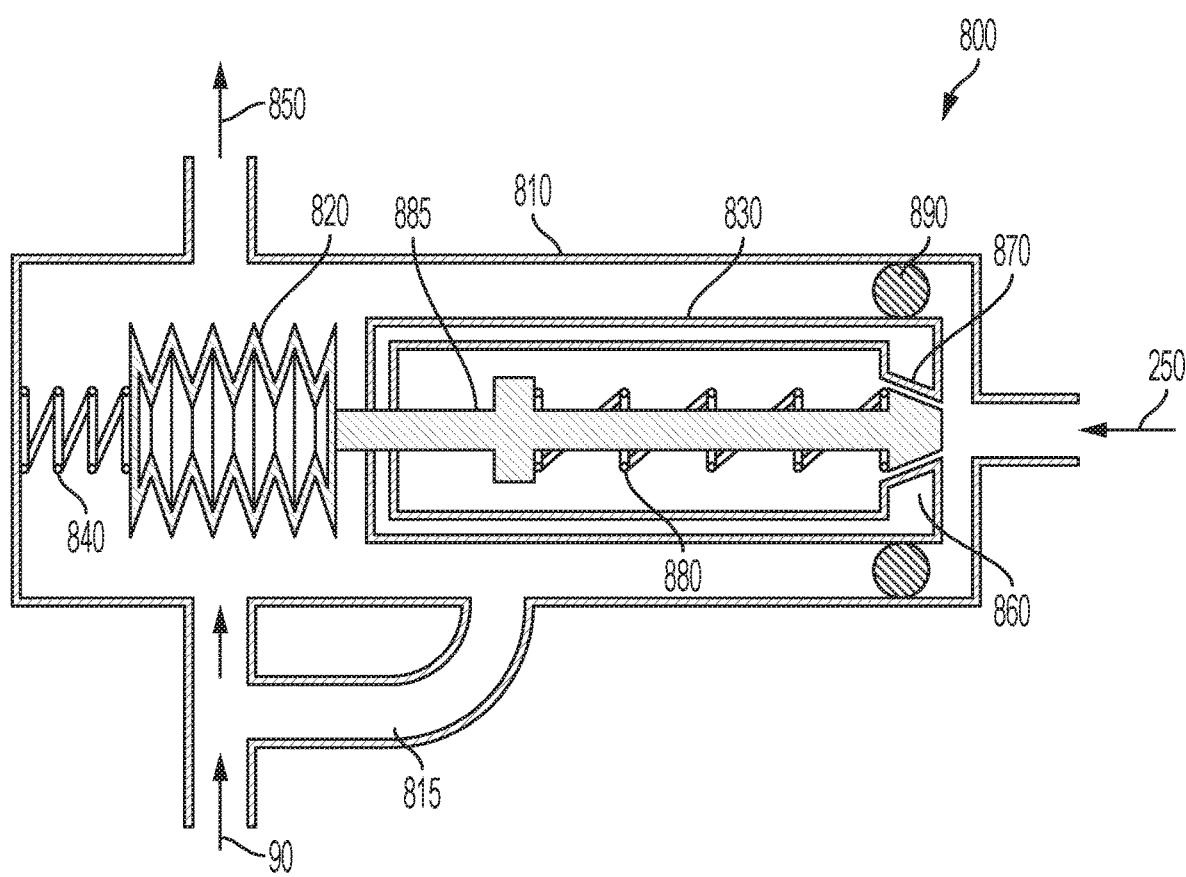

FIG. 6C shows alternative embodiment #1 of the bypass control valve 800. This embodiment consists of a housing 810, sensing device 820, mechanical valve 830, and a damage prevention device 840. The sensing device 820 in this embodiment is a bellows type device which includes at least one phase change material (PCM) where the melt temperature of the PCM is near the desired fluid temperature of return to pump stream 850. The mechanical valve 830 consists of a cartridge 860 with a variable orifice 870 where the orifice opening is controlled by a spring 880 loaded needle 885. The volume change associated with freezing and melting of the PCM is used to generate higher force and motion changes per degree change than available for single phase devices. A seal 890 prevents flow between the cartridge 860 and the housing 810. With increasing temperature of the sensing device 820, the solid PCM begins to melt. As the PCM melts, the sensing device 820 expands and exerts a force on the needle 885 through physical contact, compresses the spring 880, such that the variable orifice 870 opening decreases and eventually closes. The variable orifice is typically completely closed when the entirety of the PCM has fully melted. As the temperature of the sensing device 820 decreases and the PCM solidifies, which causes the sensing device 820 to contract, the force exerted on the needle 885 decreases. With a decrease in applied force, the spring 880 opens the variable orifice 870 opening. The variable orifice opening 870 controls the flow of liquid bypass flow from the liquid distribution header 85 through the liquid bypass line 250 such that the flow of liquid bypass flow from the liquid distribution header 85 increases with decreasing force exerted by the sensing device 820. Conversely, as the force exerted by the sensing device 820 increases, the variable orifice 870 opening closes and reduces the liquid bypass flow. Liquid from the liquid distribution header 85 enters the housing from the liquid bypass line 250 and flows through the cartridge 860 via the variable orifice 870. This fluid is then directed into the housing 810, away from the cartridge 860. The fluid from the collection header 90 and the fluid from the liquid bypass line 250 are mixed prior to the sensing device 820 into a combined stream. The combined stream from the collection header 90 and the liquid bypass line 250 enters the housing prior to the sensing device 820. The combined stream flows past the sensing device 820 such that the temperature of the combined stream and the sensing device 820 become similar. The preferred flow path of the combined stream for a bellows type sensing device is in cross flow so as to maximize heat transfer between the combined stream and the sensing device 820. Accordingly, branch channel 815 comes off the mechanical valve 830 to permit the mixing of fluids from the bypass line 250 and collection heater 90. The combined stream then exits the housing to return to the pump. The damage prevention device 840, which is optional, in this embodiment is a spring or similar compressible material. The damage prevention device 840 is used to prevent damage to the sensing device 820, needle 885, or housing 810 during storage and operation when temperatures exceed minimum or maximum design temperatures. When this occurs, differences in thermal expansion coefficients of dissimilar materials may result in extreme forces on the components, resulting in permanent damage. The damage prevention device functions as a rigid surface during normal operation but is compressible when forces exceed normal conditions. The damage prevention device 840 is shown between to the sensing device 820 and housing 810. Alternate embodiments (not shown) include the damage prevention device 840 between to the cartridge 860 and the housing 810 or between the sensing device 820 and needle 885.

Figure 6D:
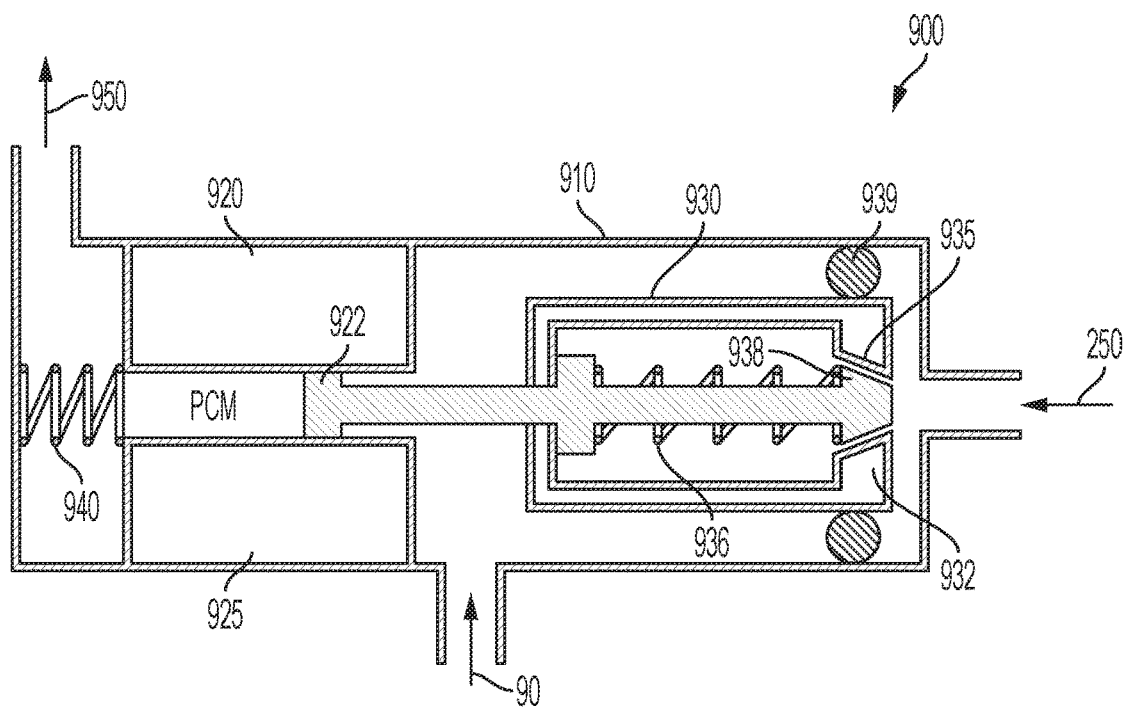

FIG. 6D shows an alternative embodiment #2 of the bypass control valve 900. This embodiment consists of a housing 910, sensing device 920, mechanical valve 930, and a damage prevention device 940. The sensing device 920 in this embodiment is a piston type device which includes at least one phase change material (PCM), piston 922, and heat transfer enhancement device 925, where the melt temperature of the PCM is near the desired fluid temperature of return to pump stream 950 and the piston 922 axial position closely tracks the physical volume occupied by the PCM. The mechanical valve 930 consists of a cartridge 932 with a variable orifice 935 where the variable orifice opening is controlled by a spring 936 loaded needle 938. The volume change associated with freezing and melting of the PCM is used to generate higher force and motion changes per degree change than available for single phase devices. A seal 939 prevents flow between the cartridge 932 and the housing 910. With increasing temperature of the sensing device 920, the solid PCM begins to melt. As the PCM melts, the PCM expands and exerts a force on the piston 922, compresses the spring 936, such that the variable orifice 935 opening decreases and eventually closes. The variable orifice is typically completely closed when the entirety of the PCM has melted. As the temperature of the sensing device 920 decreases and the PCM solidifies which causes the PCM to contract, the force exerted on the piston 922 decreases. With a decrease in applied force, the spring 936 opens the variable orifice 935 opening. The variable orifice 935 opening controls the flow of liquid bypass flow from the liquid distribution header 85 through the liquid bypass line 250 such that the flow of liquid bypass flow from the liquid distribution header 85 increases with decreasing force exerted by the sensing device 920. Conversely, as the force exerted by the sensing device 920 increases, the variable orifice 935 opening closes and reduces the liquid bypass flow. Liquid bypass flow from the liquid distribution header 85 enters the housing 910 from the liquid bypass line 250 and flows through the cartridge 932 via the variable orifice 935. The fluid from the collection header 90 and the fluid from the liquid bypass line 250 are mixed prior to the sensing device 920 into a combined stream. The flow from the collection header 90 enters the housing 910 prior to the sensing device 920. The combined stream flows past the sensing device 920 such that the temperature of the combined stream and the sensing device 920 become similar. The preferred flow path of the combined stream for a piston type sensing device 922 is coaxial so as to maximize heat transfer between the combined stream and the sensing device 920 and promote uniform melting/freezing of the PCM. The combined stream then exits the housing 910 to return to the pump. The damage prevention device 940, which is optional, in this embodiment is a spring or similar compressible material. The damage prevention device 940 is used to prevent damage to the sensing device 920, needle 938, or housing 910 during storage and operation when temperatures exceed minimum or maximum design temperatures. When this occurs, differences in thermal expansion coefficients of dissimilar materials may result in extreme forces on the components, resulting in permanent damage. The damage prevention device functions as a rigid surface during normal operation but is compressible when forces exceed normal conditions. The damage prevention device 940 is shown between to the sensing device 920 and housing 910. Alternate embodiments (not shown) include the damage prevention device 940 between to the cartridge 932 and the housing 910. Integral to the piston type sensing device 922 is an optional heat transfer enhancement device 925, which is further discussed below. The heat transfer enhancement device 925 decreases the temperature difference between the fluid external to the sensing device and the sensing device during transient operation which decreases the response time.

Figures 1, 6D:
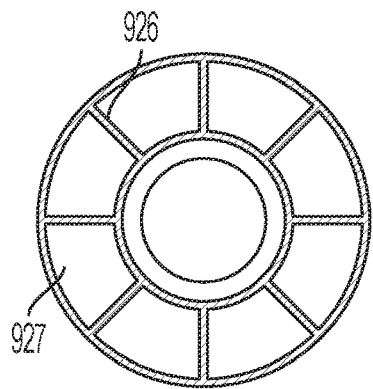
Figures 2, 6D:
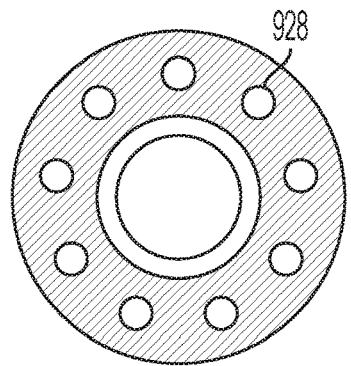
Figures 3, 6D:
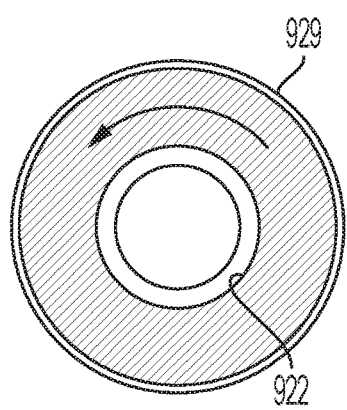
Figures 4, 6D:
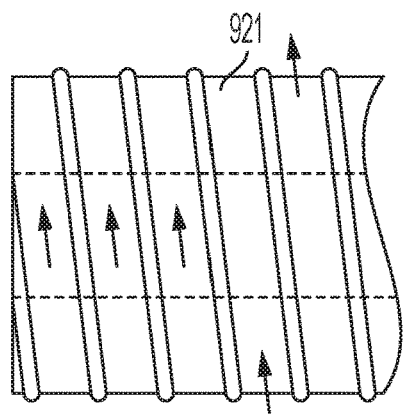

FIG. 6D-1 shows one embodiment of the heat transfer enhancement device 925 on a piston type sensing device 922. In this embodiment, external fins 926 are attached to the outer surface of the sensing device 920 and positioned coaxially to the piston 922. The combined stream flows through the cavity 927 located between fins 926, between the piston outer surface and the housing inner surface. The fins 926 are preferably fabricated from a high thermal conductivity material, such as copper or aluminum.

FIG. 6D-2 shows another embodiment of the heat transfer enhancement device 925 on a piston type sensing device 922. In this embodiment, internal passages 928 direct the combined stream through the sensing device 920. The internal passages may be completely surrounded by piston housing material, which is preferably a high thermal conductivity material, such as copper or aluminum.

FIG. 6D-3 shows another embodiment of the heat transfer enhancement device 925 on a piston type sensing device 922. In this embodiment, external fins 929 are attached to the outer surface of the sensing device 920 and spiraled around the piston 922 like a helix, such that the fluid flow path serpentines around the piston 922 at least once. The combined stream flows through the cavity 921 located between fins 929, between the piston outer surface and the housing inner surface. The fins 929 are preferably fabricated from a high thermal conductivity material, such as copper or aluminum.

Figure 6E:
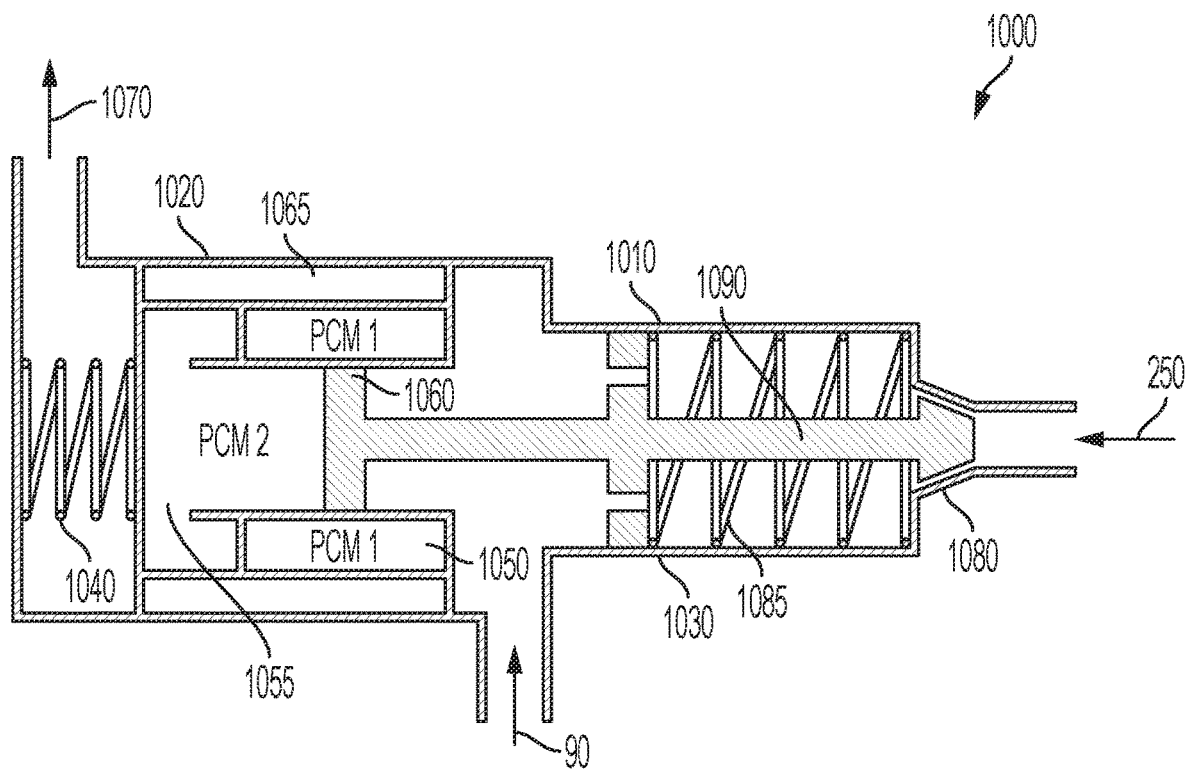
Figures 1, 6E:
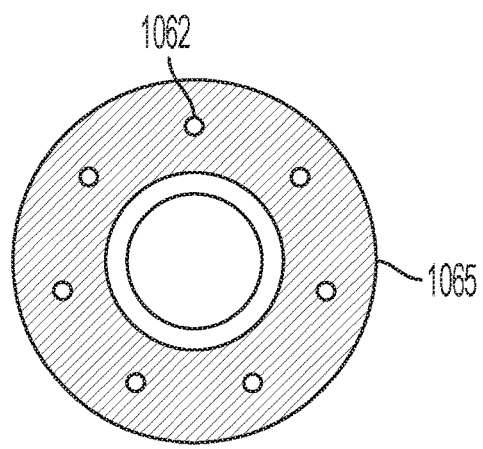

FIG. 6E shows an alternative embodiment #3 of the bypass control valve 1000. This embodiment consists of a housing 1010, sensing device 1020, mechanical valve 1030, and a damage prevention device 1040. The sensing device 1020 in this embodiment is a piston type device which includes at least two phase change materials (PCM) 1050 and 1055, piston 1060, and heat transfer enhancement device 1065 in thermal contact with PCM 1 1050, where the melt temperature of the PCM 1 1050 is near the desired fluid temperature of return to pump stream 1070 and the piston 1060 axial position closely tracks the physical volume occupied by the PCM 1 1050. PCM 2 1055 has a melt temperature substantially lower than PCM 1 1050 such that PCM 2 1055 remains liquid over the majority of the operating space. Ideally, both PCM materials are not miscible and remain separated. High thermal conductivity of PCM 2 1055 is desirable such that PCM 1 1050 is not required to be completely in contact with external surface of the sensing device 1020. The mechanical valve 1030 consists of a variable orifice 1080 where the variable orifice opening is controlled by a spring 1085 loaded needle 1090 which directly seats into the housing 1010. The volume change associated with freezing and melting of the PCM 1 1050 is used to generate higher force and motion changes per degree change than available for single phase devices. With increasing temperature of the sensing device 1020, the solid PCM 1 1050 begins to melt. As the PCM 1 1050 melts, the PCM 1 1050 expands and exerts a force on PCM 2 1055 which in turn exerts a force on the piston 1060, compresses the spring 1085, such that the variable orifice 1080 opening decreases and eventually closes. The variable orifice 1080 is typically completely closed when the entirety of the PCM has melted. As the temperature of the sensing device 1020 decreases and the PCM 1 1050 solidifies which causes the PCM 1 1050 to contract and the force exerted on the piston 1060 by PCM 2 1055 decreases. With a decrease in applied force, the spring 1085 opens the variable orifice 1080 opening. The variable orifice 1080 opening controls the flow of liquid bypass flow from the liquid distribution header 85 through the liquid bypass line 250 such that the flow of liquid bypass flow from the liquid distribution header 85 increases with decreasing force exerted by the sensing device 1020. Conversely, as the force exerted by the sensing device 1020 increases, the variable orifice 1080 opening closes and reduces the liquid bypass flow. Liquid bypass flow from the liquid distribution header 85 enters the housing 1010 from the liquid bypass line 250 via the variable orifice 1080. The fluid from the collection header 90 and the fluid from the liquid bypass line 250 are mixed prior to the sensing device 1020 into a combined stream. The flow from the collection header 90 enters the housing 1010 prior to the sensing device 1020. The combined stream flows past the sensing device 1020 such that the temperature of the combined stream and the sensing device 1020 become similar. The preferred flow path of the combined stream for a piston type sensing device 1060 is coaxial so as to maximize heat transfer between the combined stream and the sensing device 1020 and promote uniform melting/freezing of the PCM 1 1050. The combined stream then exits the housing 1010 to return to the pump. The damage prevention device 1040, which is optional, in this embodiment is a spring or similar compressible material is used to prevent damage to the sensing device 1020, needle 1090, or housing 1010 during storage and operation when temperatures exceed minimum or maximum design temperatures. When this occurs, differences in thermal expansion coefficients of dissimilar materials may result in extreme forces on the components, resulting in permanent damage. The damage prevention device functions as a rigid surface during normal operation but is compressible when forces exceed normal conditions. The damage prevention device is shown between the sensing device 1020 and housing 1010. Alternate embodiments (not shown) include the damage prevention device 1040 between to the piston 1060 and the needle 1090. Integral to the piston type sensing device 1020 is an optional heat transfer enhancement device 1065 with internal passages 1062, see FIG. 6E-1. The heat transfer enhancement device decreases the temperature difference between the combined stream and the PCM 2 1050.

Figure 6F:
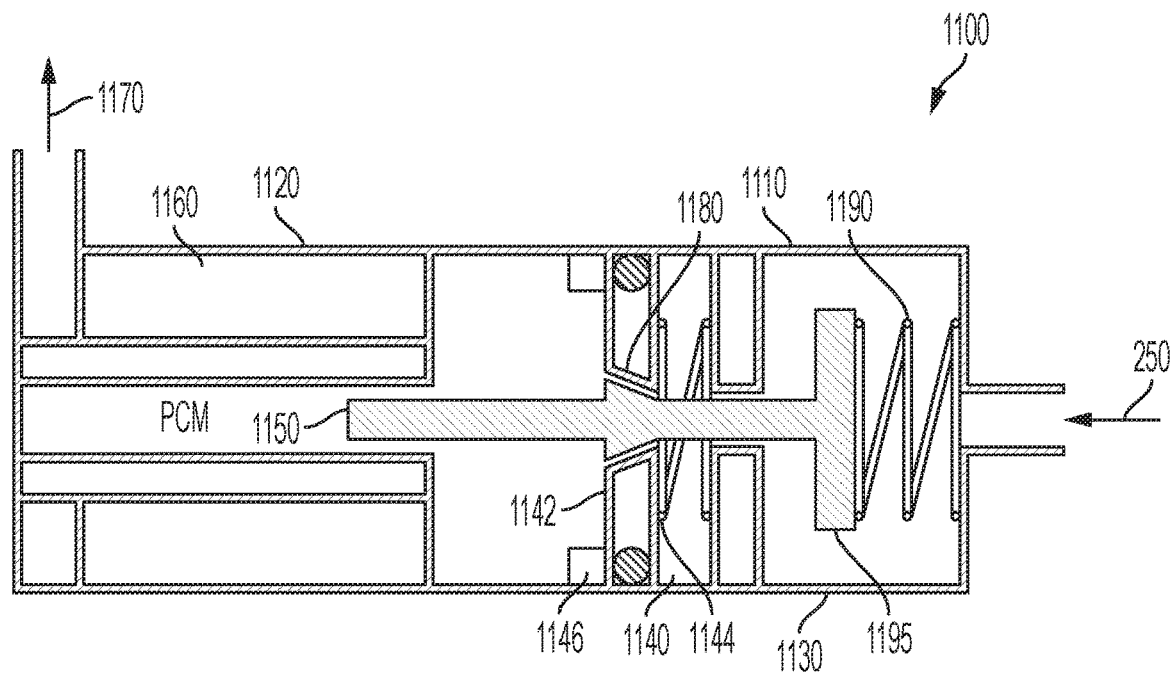

FIG. 6F shows an alternative embodiment #4 of the bypass control valve 1100. This embodiment consists of a housing 1110, sensing device 1120, mechanical valve 1130, and a damage prevention device 1140 where the sensing device 1120 and mechanical valve 1130 are integral to the housing 1110. The sensing device in this embodiment is a piston type device which includes at least one phase change material (PCM), piston 1150, and heat transfer enhancement device 1160, where the melt temperature of the PCM is near the desired fluid temperature of return to pump stream 1170 and the piston 1150 axial position closely tracks the physical volume occupied by the PCM. The mechanical valve 1130 consists of a variable orifice 1180 where the variable orifice opening is controlled by a spring 1190 loaded needle 1195. The volume change associated with freezing and melting of the PCM is used to generate higher force and motion changes per degree change than available for single phase devices. With increasing temperature of the sensing device 1120, the solid PCM begins to melt. As the PCM melts, the PCM expands and exerts a force on the piston 1150, compresses the spring 1190, such that the variable orifice 1180 opening decreases and eventually closes. The variable orifice is typically completely closed when the entirety of the PCM has melted. As the temperature of the sensing device 1120 decreases and the PCM contained within solidifies which causes the PCM to contract and the force exerted on the piston 1150 decreases. With a decrease in applied force, the spring 1190 opens the variable orifice 1180 opening. The variable orifice 1180 opening controls the flow of liquid bypass flow from the liquid distribution header 85 through the liquid bypass line 250 such that the flow of liquid bypass flow from the liquid distribution header 85 increases with decreasing force exerted by the sensing device 1120. Conversely, as the force exerted by the sensing device 1120 increases, the variable orifice 1180 opening closes and reduces the liquid bypass flow. Liquid bypass flow from the liquid distribution header 85 enters the housing 1110 from the liquid bypass line 250 via the variable orifice 1180. The fluid from the collection header 90 and the fluid from the liquid bypass line 250 are mixed prior to the sensing device 1120 into a combined stream. The flow from the collection header 90 enters the housing 1110 prior to the sensing device 1120. The combined stream flows past the sensing device 1120 such that the temperature of the combined stream and the sensing device 1120 become similar. The preferred flow path of the combined stream for a piston type sensing device 1150 is coaxial so as to maximize heat transfer between the combined stream and the sensing device 1120 and promote uniform melting/freezing of the PCM. The combined stream then exits the housing 1110 to return to the pump. The damage prevention device 1140, which is optional, in this embodiment is a spring or similar compressible material. The damage prevention device 1140 which maintains the variable orifice 1180 opening, is used to prevent damage to the sensing device 1120, needle 1195, or housing 1110 during storage and operation when temperatures exceed minimum or maximum design temperatures. When this occurs, differences in thermal expansion coefficients of dissimilar materials may result in extreme forces on the components, resulting in permanent damage. The damage prevention device 1140 for an integral configuration consists of a movable orifice opening 1142 and semi-rigid damage prevention spring 1144. The semi-rigid damage prevention spring 1144 functions as a rigid surface during normal operation but is compressible when forces exceed normal conditions. Under extreme pressure conditions, the variable orifice 1180 opening moves axially. The variable orifice opening is a combination of a movable orifice plate 1142 and needle 1195. A physical stop 1146 and the semi-rigid damage prevention spring 1144 maintains the movable orifice plate 1142 stationary under normal operating conditions such that the variable orifice 1180 opening is controlled solely by the movement of the needle 1195.

Figure 6G:
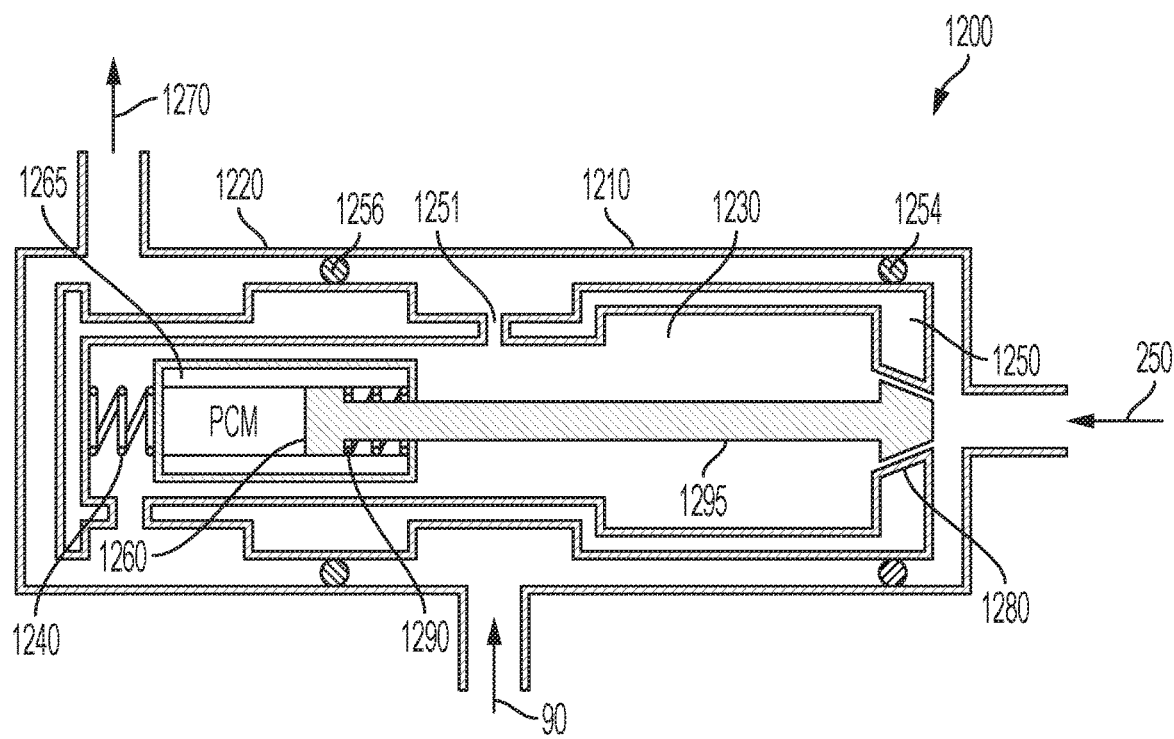

FIG. 6G shows an alternative embodiment #5 of the bypass control valve 1200. This embodiment consists of a housing 1210, sensing device 1220, mechanical valve 1230, and a damage prevention device 1240 where the sensing device 1220 and mechanical valve 1230 are integral to a cartridge body 1250. The sensing device 1220 in this embodiment is a piston type device which includes at least one phase change material (PCM), piston 1260, and heat transfer enhancement device 1265, where the melt temperature of the PCM is near the desired fluid temperature of return to pump stream 1270 and the piston 1260 axial position closely tracks the physical volume occupied by the PCM. The mechanical valve 1230 consists of a variable orifice 1280 where the variable orifice opening is controlled by a spring 1290 loaded needle 1295. The volume change associated with freezing and melting of the PCM is used to generate higher force and motion changes per degree change than available for single phase devices. With increasing temperature of the sensing device 1220, the solid PCM begins to melt. As the PCM melts, the PCM expands and exerts a force on the piston 1260, compresses the spring 1290, such that the variable orifice 1280 opening decreases and eventually closes. The variable orifice is typically completely closed when the entirety of the PCM has melted. As the temperature of the sensing device 1220 decreases and the PCM solidifies which causes the PCM to contract and the force exerted on the piston 1260 decreases. With a decrease in applied force, the spring 1290 opens the variable orifice 1280 opening. The variable orifice 1280 opening controls the flow of liquid bypass flow from the liquid distribution header 85 through the liquid bypass line 250 such that the flow of liquid bypass flow from the liquid distribution header 85 increases with decreasing force exerted by the sensing device 1220. Conversely, as the force exerted by the sensing device 1220 increases, the variable orifice 1280 opening closes and reduces the liquid bypass flow. Liquid bypass flow from the liquid distribution header 85 enters the housing 1210 from the liquid bypass line 250. A seal 1254 prevents flow between the cartridge body 1250 and housing 1210. Liquid bypass flow enters the cartridge body via the variable orifice 1280. The fluid from the collection header 90 enters the housing 1210 then enters the cartridge body 1250 through the thru hole 1251. Fluid from the collection header 90 is prevented from bypassing the cartridge body 1250 by a seal 1256. The fluid from the collection header 90 and the fluid from the liquid bypass line 250 are mixed prior to the sensing device 1220 into a combined stream. The flow from the collection header 90 enters the cartridge body 1250 prior to the sensing device 1220. The combined stream flows past the sensing device 1220 such that the temperature of the combined stream and the sensing device 1120 become similar. The preferred flow path of the combined stream for a piston type sensing device 1220 is coaxial so as to maximize heat transfer between the combined stream and the sensing device 1220 and promote uniform melting/freezing of the PCM. The combined stream then exits the housing at 1270 to return to the pump.

The damage prevention device 1240, which is optional, in this embodiment is a spring or similar compressible material. The damage prevention device 1240 is used to prevent damage to the sensing device 1220, needle 1295, or cartridge body 1250 during storage and operation when temperatures exceed minimum or maximum design temperatures. When this occurs, differences in thermal expansion coefficients of dissimilar materials may result in extreme forces on the components, resulting in permanent damage. The damage prevention device functions as a rigid surface during normal operation but is compressible when forces exceed normal conditions. The damage prevention device 1240 is shown between to the sensing device 1220 and cartridge body 1250. Integral to the piston type sensing device 1260 is an optional heat transfer enhancement device 1265. The heat transfer enhancement device 1265 decreases the temperature difference between the fluid external to the sensing device and the sensing device.

The MMC-TDR will use increase pressure losses and heat transfer from the outer channels 105 with a variable opening PCM bypass valve 200 to selectively reduce flow through the outer most channels 105 as heat load is reduced. The reduction in flow will result in high degrees of subcooling until freezing occurs. The percentage of flow through the bypass line 250 versus the radiator channels 105 and 110 is passively controlled by modulating the bypass valve position, increasing or reducing the bypass line pressure drop relative to the channel pressure drops. The PCM bypass valve 200 regulates the flow through the system to achieve the desired subcooled temperature, effectively allowing the radiator channels to gradually lose flow and freeze during periods of low desired heat dissipation (high turn down). The PCM bypass valve 200 will use the volume change between liquid and solid phases of the PCM to modulate the valve position.

Figure 8:
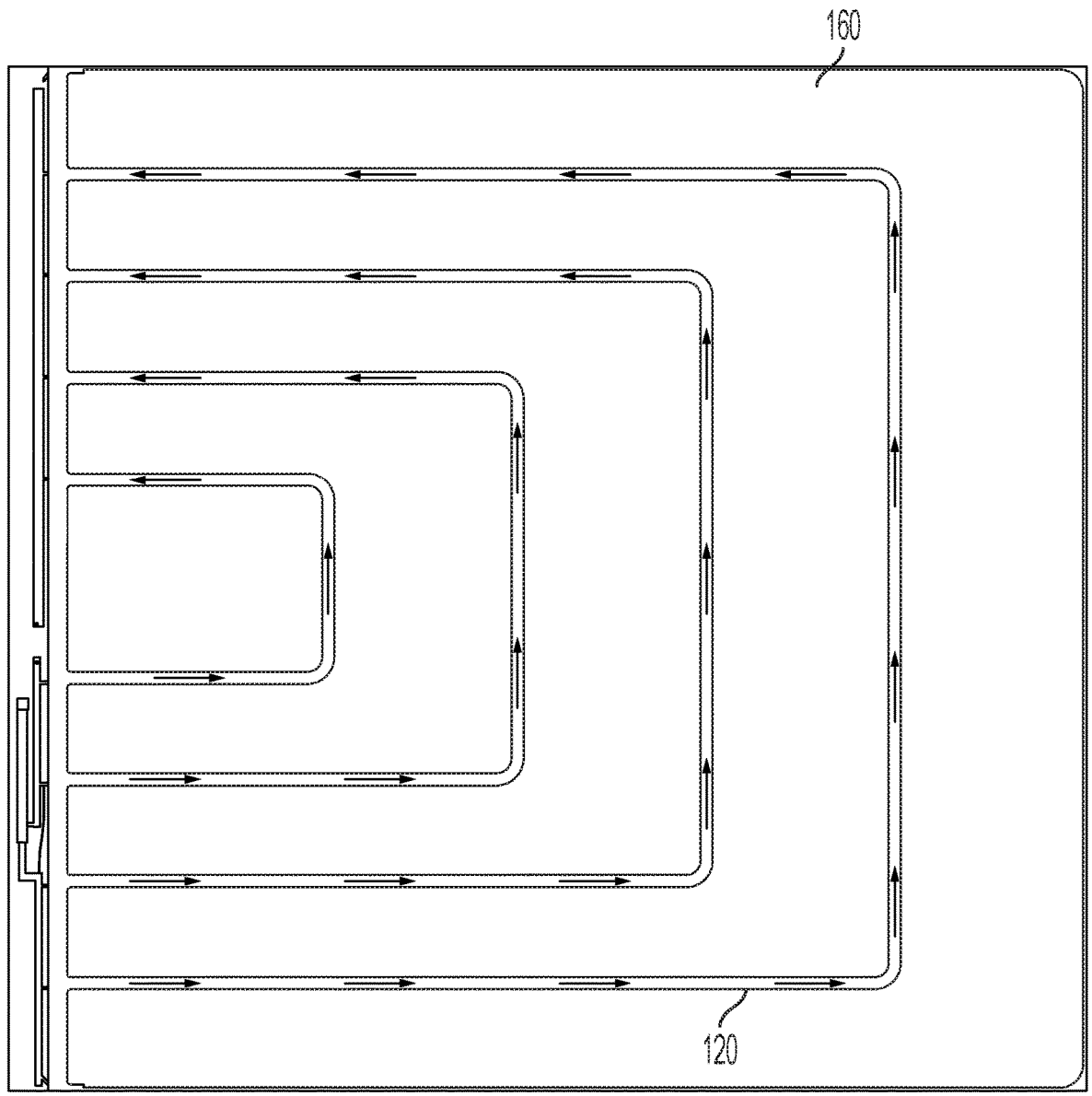
FIG. 8 shows the flow path of the refrigerant through the radiator panel.

As depicted in FIGS. 7 and 8, the radiator panel 60 is constructed of a series of parallel "U" channels 120. The channels are constructed of aluminum encased Inconel tubes 130. The aluminum encasing material 140 is bonded, e.g., brazing 150, to a thin aluminum panel 160 for increased radiator area.

The radiator panel 60 design includes multiple parallel flow paths as shown in FIG. 8. The radiator panel 60 consists of a single aluminum base plate panel 160 with aluminum-encased Inconel tubes brazed directly to the aluminum panel, as shown in FIG. 7. The panel is 1 $m^2$ in area, and has an estimated weight of 7.2 $kg/m^2$. The Inconel and aluminum materials have been demonstrated in space application to last in excess of the 15-year life requirement. The inlet and outlet ports, distribution and collection headers, and bypass line and valve are all incorporated onto a single edge of the radiator called the control module 70. The vapor and liquid ammonia enter the inlet port 75 in the control module 70, and are fed into distribution headers 80 and 85, where the flow is distributed to the radiator tubes and/or the bypass line 250. The ammonia that flows through the radiator tubes emerges at the collection header 90 on the other side of the radiator panel 60. A percentage of the liquid ammonia also flows through a bypass line 250, where it bypasses the radiator tubes entirely, as controlled by the bypass valve 200 discussed above.

In the radiator, vapor is preferentially fed into the outer channels 105, and the liquid is routed to the shorter, inner channels 110. This is because of heat load and pressure drop considerations. The majority (~78%) of peak thermal load in the expected flow is in the vapor phase, due to the large latent heat of phase change that results during condensation in the radiator panel. The outer channels 105 for the vapor are then necessarily longer to dissipate this energy through radiation. The longer flow path through the vapor outer channels 105 also helps equalize the pressure difference between liquid and vapor phases, created by the drop given to the liquid from passing it through the membrane phase separator 50.

The radiator selectively freezes channels under decreasing heat load conditions. During high heat loads, when the temperature of the ammonia return stream is above the desired temperature, the bypass valve 200 closes, restricting flow by increasing pressure drop through the bypass line 250 and promoting the majority of ammonia to enter the radiator tubes. The valve opens to decrease the fluid temperature in the return line 25 to the target temperature. When the heat duty begins to reduce, the ammonia exiting the radiator will become cooler, and the bypass valve 200 will open, reducing the pressure drop in the bypass line 250, promoting a higher percentage of flow to bypass the radiator tubes. Blending of the increased fraction of warm fluid through the bypass line 250 with the now colder fluid but lower flowrate fluid from the return header 90 results in an increasing of the fluid temperature in the return line 25. The decrease in flow through the radiator tube in turn will further lower the ammonia temperature in the tube exits, so that the longest tubes will begin freezing. The non-equal length of the tubes will promote tube freezing from the outside in, in other words starting with the outer channel 105 and moving toward the inner channels 110. At the highest turn-down ratio, the entire flow will be routed through the bypass valve 200. The bypass valve 200 is embedded in the header of the radiator, in order to allow thermal communication with the radiator panel. Through conduction in the aluminum plate 160, the radiator channels are thawed when the incoming ammonia begins to raise in temperature again. The conduction is aided by the high thermal conductivity of the aluminum plate (237 W/m-° K) and the high temperature gradient between the circulating liquid phase and frozen phase of ammonia (40° C. to −80° C.).

The radiator achieves the high 200:1 turndown ratio through selective freezing of the ammonia in the radiator tubes. As such, the radiator tubes and surrounding structure are designed to handle the extremely high pressures that may result from the ammonia density changes upon freezing and thawing.

Ammonia contracts 10% by volume when it freezes. If heat is applied nonuniformly to a tube entirely filled with ammonia, the resulting expansion in volume of the thawing ammonia exerts tremendous force on the tube walls. In order to contain these forces, the inventive design leverages extensive NASA work with freeze-tolerant radiator tubing, deployed in missions including the International Space Station. The tubing is made from ⅛" OD Inconel 718, that possesses a high yield strength of 1029 MPa and retains its material properties at cryogenic temperatures. The tubing has been identified as the most reliable and cost-effective radiator freeze-handling solution. Previous work has shown that the internal pressure from thawing ammonia reaches a maximum of 124 MPa inside the tubes, while the internal pressure tolerance of the Inconel tubing is 1276 MPa, leading to a safety factor of 4. The tubing has furthermore been calculated to tolerate $5 \times 10^6$ freeze/thaw cycles, for an essentially unlimited fatigue life. The Inconel tubing is incorporated into the aluminum radiator plate to promote thermal communication between adjacent tubes.

While we have shown and described several embodiments in accordance with our invention, it should be understood that the same is susceptible to further changes and modifications without departing from the scope of our invention. Therefore, we do not want to be limited to the details shown and described herein but intend to cover all such changes and modifications as are encompassed by the scope of the appended claims.

What is claimed is:

1. A radiator using a three-phase working fluid that is incorporated into a two phase pump loop having a pump using the three-phase working fluid, comprising:
    a radiator panel having at least one outer flow channel for the working fluid to transition from vapor phase, to liquid phase, and solid phase and at least one inner flow channel for the working fluid to transition from liquid phase to solid phase;
    a control module having a liquid distribution header, a vapor distribution header, and a collection header, wherein the at least one inner flow channel is connected to the liquid distribution header and the collection header and the at least one outer flow channel is connected to the vapor distribution header and the collection header;
    a membrane phase separator that separates the incoming stream of working fluid from the two phase pump loop into vapor and liquid using a capillary action; and
    a bypass phase change material (PCM) control valve for maintaining a consistent temperature of the working fluid returning to the pump.

2. The radiator of claim 1, wherein the bypass PCM control valve contains a sensing device and a mechanical valve, wherein the sensing device exerts a force on the mechanical valve whereby the force increases with an increasing temperature of the sensing device such that the increasing force causes the valve to close and the force decreases with a decreasing temperature of the sensing device such that decreasing force causes the valve to open.

3. The radiator of claim 2, wherein the sensing device contains at least one phase change material.

4. The radiator of claim 3, wherein the sensing device contains at least one heat transfer enhancement device.

5. The radiator of claim 2, wherein the bypass PCM control valve contains a damage prevention device.

* * * * *